United States Patent [19]

Pucci

[11] Patent Number: 5,090,357

[45] Date of Patent: Feb. 25, 1992

[54] AQUARIUM

[76] Inventor: Kenneth J. Pucci, 1300 Fayette St., Apt. 53 Hopkins, Conshohocken, Pa. 19428

[21] Appl. No.: 645,624

[22] Filed: Jan. 25, 1991

[51] Int. Cl.⁵ .............................................. A01K 63/00
[52] U.S. Cl. ............................................ 119/5; 30/106
[58] Field of Search ........................ 119/5, 15, 17, 4; 30/101–107

[56] References Cited

U.S. PATENT DOCUMENTS

| | | | |
|---|---|---|---|
| 278,465 | 4/1885 | Goldman et al. | D30/106 |
| 1,838,215 | 12/1931 | Clairmont | 119/5 |
| 1,991,683 | 2/1935 | Kelly | 119/5 |
| 3,288,110 | 11/1966 | Goldman et al. | 119/5 |
| 3,512,503 | 5/1970 | Willinger | 119/5 |
| 3,618,238 | 11/1971 | Willinger | D30/106 |

FOREIGN PATENT DOCUMENTS 3534  5/1991  Switzerland ............................ 119/5

Primary Examiner—John G. Weiss
Attorney, Agent, or Firm—H. Jay Spiegel

[57] ABSTRACT

An improved aquarium includes an aquarium having structure on the sides thereof to permit the placement of a plurality of plates having different designs and configurations thereon. Plates having different aquatic designs thereon provide an enhanced three-dimensional effect to the aquarium. Furthermore, a plate having a mirrored surface thereon may be installed in the aquarium to create the illusion of a larger aquarium. The aquarium includes structure to permit the interchangeability of different plates such that the overall aquarium appearance may be readily transformed.

6 Claims, 1 Drawing Sheet

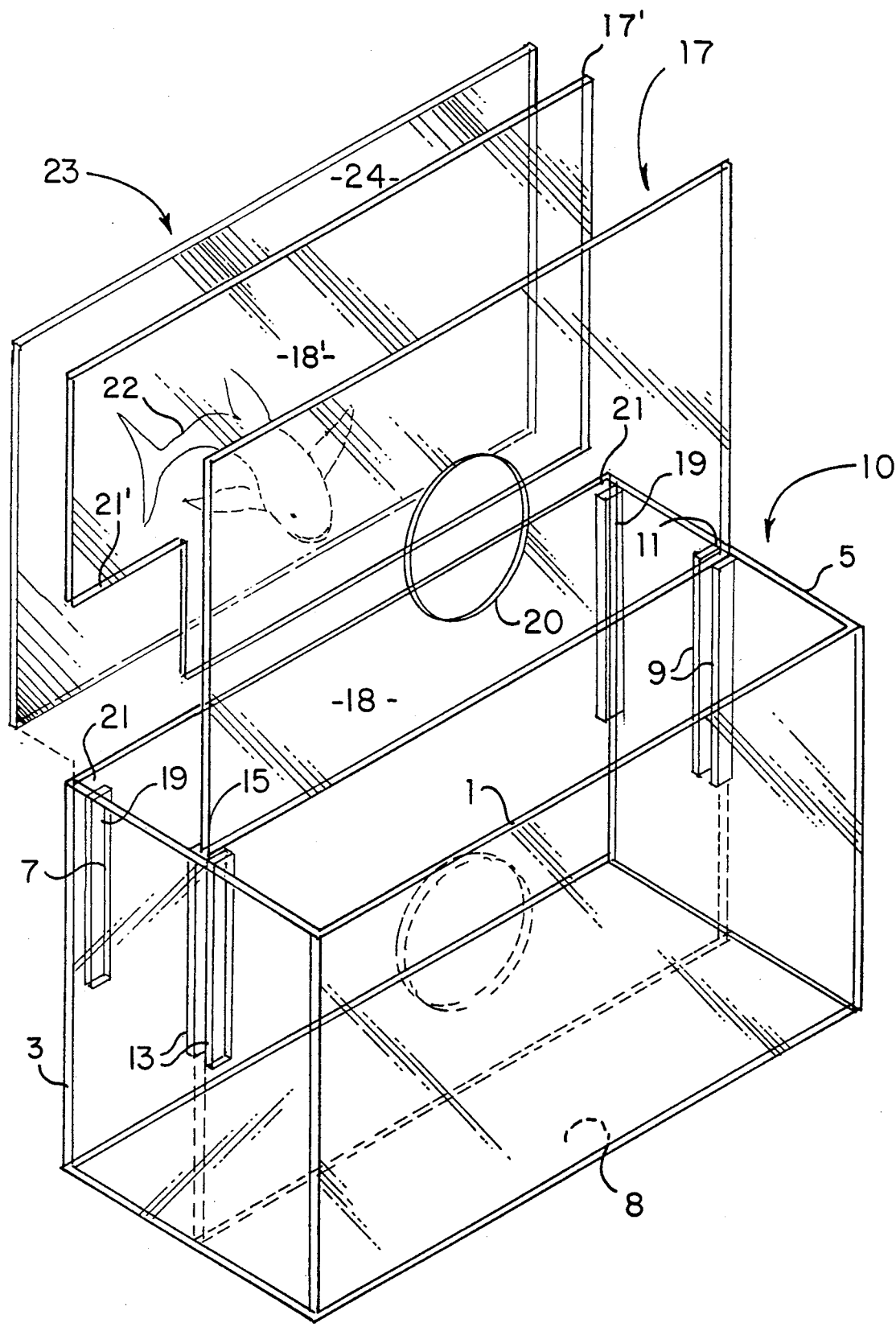

AQUARIUM

BACKGROUND OF THE INVENTION

The present invention relates to an improve aquarium. The improved aquarium includes an aquarium with a plurality of dividers or background plates which enhance the aesthetics and functionality of the aquarium.

In the prior art, aquariums per se are known. However, Applicant is unaware of any prior art that teaches or fairly suggests an aquarium including a plurality of interchangeable plates, the plates having a design thereon to enhance the aesthetics of the aquarium.

SUMMARY OF THE INVENTION

The present invention relates to an improved aquarium. The present invention includes the following interrelated aspects and features:

(a) In a first aspect, the improved aquarium includes a plurality of plates which are designed to be inserted within the aquarium such that the plates are parallel to the front face of the aquarium.

(b) In a first embodiment, a plate may have a design thereon to provide a more three-dimensional aspect to the aquarium. Furthermore, the plate may have an opening therein to permit aquatic animals to pass therethrough.

(c) In the second embodiment, a plate having a mirrored surface may be installed against the back surface of the aquarium so as to give the viewer the illusion that the aquarium is larger than it really is.

(d) In a third embodiment, additional plates may be provided with openings in different locations and having different designs thereon.

Accordingly, it is a first object of the present invention to provide an improved aquarium.

It is a further object of the present invention to provide an aquarium having a plurality of insertable dividing plates therewith to enhance the aesthetics thereof.

It is a still further object of the present invention to provide insertable dividing plates having different designs and configurations which provide different scenarios within the aquarium.

These and other objects, aspects and features of the present invention will be better understood from the following detailed description of the preferred embodiments when read in conjunction with the appended drawing FIGURE.

BRIEF DESCRIPTION OF THE DRAWINGS

The sole FIGURE shows a side perspective view of the improved aquarium and the various divider plates therewith.

SPECIFIC DESCRIPTION OF THE PREFERRED EMBODIMENTS

With reference to the sole FIGURE, the improved aquarium of the present invention is generally designated by the reference numeral 10 and is seen to include a front portion 1, a back portion 3, side portions 5 and 7 and a bottom portion 8. The side portion 5 includes a pair of elongated members 9 attached thereto which create a slot 11. In a similar manner, the side portion 7 includes a pair of elongated members 13 attached thereto which create a slot 15. The slots 11 and 15 are designed to receive and guide plate 17 when inserted into the aquarium. The plate 17 is shown in phantom in the inserted position.

The plate 17 includes a circular opening 20 therein and a surface 18 thereon. The circular opening 20 permits fish to pass therethrough when the plate 17 is installed in the aquarium.

In an alternative embodiment, and as shown in the sole FIGURE, a second plate 17, may be placed in the aquarium via slots 11 and 15. The plate 17' may include an opening 20' therein which is in a different location than the opening 20 located on the plate 17. Furthermore, the surface 18' of the plate 17' may have a design such as the fish 22 depicted thereon to provide a more three-dimensional aspect of the aquarium. Of course, other designs such as aquatic plant life, rocks or the like may be used in combination with designs of fish or used alone. Alternatively, and as shown with plate 17, the surface 18 may be devoid of design such that the plate 17 merely acts as a divider plate.

In an additional embodiment, the side portions 5 and 7 may include an elongated member 19 thereon which, when combined with the back portion 3 forms a slot 21 therein. A plate 23 having a mirrored surface 24 may be inserted into the slot 21 and against the back portion 3 of the aquarium so as to create the illusion that the aquarium is, in fact, bigger than it really is due to the reflection of the fish, the designs on the plate 17' and other articles located in the aquarium. Alternatively, the plate 23 may have a colored background or a design similar to that shown on the plate 17' to further enhance the aesthetics of the aquarium.

The aquarium as well as the divider plates may be made of glass or plastic with the elongated members being made of plastics to facilitate their attachment to the aquarium sides. The elongated members may be attached in any conventional fashion such as with the use of silicone glue or the like.

The improved aquarium of the present invention provides advantages over other prior art devices in that the slotted structure of the side portions of the aquarium permit interchangeability between plates having different configurations with respect to openings therethrough as well as designs. Furthermore, although the plates have been shown to bisect the aquarium, other configurations may be used such that the chambers created by the placement of the dividing plate in the aquarium are unequal in volume.

As such, an invention has been disclosed in terms of preferred embodiments thereof which fulfill each and every one of the objects of the present invention as set forth hereinabove and provides a new and improved aquarium of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An improved aquarium comprising:
   (a) a body having a front wall, back wall, bottom wall and two side walls, said body defining a chamber;
   (b) first and second plates; and
   (c) means for receiving said first and second plates in said aquarium between said two side walls, said first plate having a mirrored surface and said second plate dividing said chamber into two subchambers, said second plate having an enlarged opening therethrough sized to allow fish in said aquarium to swim therethrough.

2. The invention of claim 1 wherein said second plate has an aquatic design thereon to provide an enhanced three-dimensional effect in said aquarium.

3. The invention of claim 2, wherein said enlarged opening through said second plate is located along an edge thereof.

4. The invention of claim 1 wherein said means for receiving said second plate comprises two pairs of elongated members each said pair located on a side wall of said aquarium, each said pair forming a slot to receive and guide an edge of said second plate into said aquarium.

5. The invention of claim 1, wherein said second plate has an aquatic design thereon and said first plate has a mirrored surface thereon, said second plate providing an enhanced three-dimensional effect in said aquarium and said first plate providing an illusion of an aquarium of greater volume.

6. The invention of claim 1, wherein said enlarged opening through said second plate is generally centrally located thereon.

* * * * *